March 28, 1950     A. R. KNIPP     2,501,948
TAILOR'S MEASURING DEVICE
Filed Sept. 14, 1946
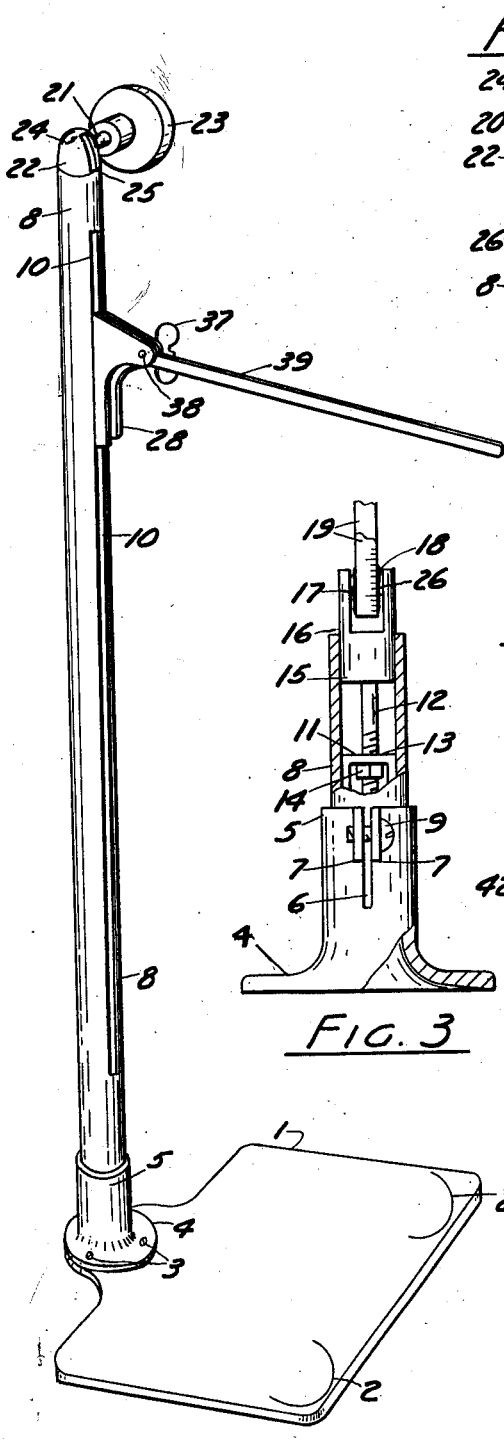
Inventor
Arthur R. Knipp
By Geo E Kirk
Attorney Patented Mar. 28, 1950

2,501,948

UNITED STATES PATENT OFFICE 2,501,948

TAILOR'S MEASURING DEVICE

Arthur R. Knipp, Napoleon, Ohio

Application September 14, 1946, Serial No. 697,049

3 Claims. (Cl. 33—8)

This invention relates to lineal dimension ready determination, especially of an individual as to an article of apparel to conform to a stature requirement desired.

This invention has utility in tailoring establishments and apparel merchandising places in the supplying of nether garments of the general character of trousers, more especially in quickly ascertaining the crotch dimension therefor, and which may be readily disclosed by the customer's position at the equipment and operation thereof to the signal or check-off position therefor.

Referring to the drawings:

Fig. 1 is a perspective view of an embodiment of the invention in a trouser leg crotch length measuring apparatus;

Fig. 2 is a detail view in side elevation of the operating handle for the unit of Fig. 1, a portion only of the column being shown;

Fig. 3 is a fragmentary detail of the base of the column of the installation of Fig. 1, showing the idler wheel and the belt or measuring band tightener therefor;

Fig. 4 is a detail on an enlarged scale, in section thru the column, showing the distance limit check arm mounting on the measuring band or tape; and Fig. 5 is a detail view from the left of Fig. 4, of the snap release audible signal for the check arm limit stop.

A base 1 has stance seat or indication means 2 to determine a desirable spread of the limbs for the individual to take the crotch or inside trouser leg measurement. Screws 3 anchor a flange 4 of a tubular clamp member 5 having a slot 6 with spaced ears 7 adapted to be drawn toward each other to lock therein the lower end of a column tube 8, by the adjustment of a screw 9.

The column 8 has longitudinally thereof a window or slot opening 10. Somewhat below the lower portion of the slot 10, a cross strip 11 (Fig. 3) is fixed in the tube 8. A threaded stem 12 extends loosely thru an opening 13 in the strip or bridge piece 11 and is engaged therebelow by a nut 14, adjustable thereon. The stem 12 is in a plug or block 15 having a forked upper end 16 across which extends a bearing pin 17 to mount a follower or idler roller 18. A lower loop of an endless belt or measuring tape 19 is about the roller 18.

The tape 19 in its extent upward inside and parallel to the slot 10, passes over a drive roller 20 on a bearing pin 21 in a top plug or cap member 22 for the tube 8. The pin 21 protrudes from the member 22 and has fixedly mounted thereon a hand wheel 23. A keep or guard 24 spans a fork 25 of the member 22 in which the roller 20 is mounted by the pin 21. The tape 19 in passing over the roller 20 is under the keep 24, which also serves as an index or pointer to determine a reading of a marking 26 on the tape 19.

Screws 27 mount a bracket 28 at a slot opening 29 in the tape 19. The screws 27 extend thru the tape 19 into a control slide 30. In the vicinity of the opening 29 the slide 30 in the tube 8 has an opening 31 to a plunger or stem 32 having a port 33 movable relatively to the openings 29, 31, held in register by the screws 27.

The plunger 32 protrudes from the lower end of the slide 30 and there extends thru a washer 34 yieldably held thereagainst by a compression helical spring 35, holding adjustment of which may be varied by nuts 36 on the stem or plunger 32 remote from the slide 30.

A wing nut 37 on a fulcrum bolt 38 provides a mounting for an arm 39, normally slightly upwardly inclined in its extent away from the column tube 8 centrally over the base 1. Inward from the fulcrum 38, the arm 39 protrudes thru the slots 29, 31, to enter the port 33 in the stem 32.

The individual, with feet spread apart and heels approximating the seats 2 in standing upon the base 1 and facing the column 8, may, as astride the arm 39, operate the hand wheel himself, or the clerk so do. The handwheel 23 thus operated causes the measuring band 19 as endless and anchored with the bracket 28 to be moved. The ascent of the arm 39 is continued until it is rocked on its fulcrum 38 to a horizontal position. The spread between the limbs of the individual from the stance on the base 1 provides a normal clearance in the approach to the crotch for the clothing at the crotch to retard further rise of the arm 39. This lag or resistance preferably is not sharp, but such as may be a comfortable limit for trouser crotch position.

The swinging of the arm 39 on its fulcrum 38, moves the plunger 32 upward relatively to its guide or slide 30 and against the resistance of the spring 35. There is a clearway 40 in a side of the guide or slide 30 downward and opposite from the opening 31. A pin 41 extends radially from the stem 32 into the way 40 above a bracket 42, having guide flanges 43 for a stem 44. The slide 30 in its clearway 40 mounts the bracket 42. A pin 45 thru the stem 44 is normally held against the lower flange 43 by a helical compression spring 46 about the stem 44 reacting against the underside of the upper flange 43. The stem 44 protrudes upwardly from the top flange of the bracket 42 and there carries a pair of complementary spring fingers 47 providing a snap throat 48 riding on the pin 41 of the stem 32.

The spring 35 normally holds the arm 39 yieldably to have a slight upward direction as extending forwardly from the column 8. Upon the turning of the handwheel 23 to such extent that the arm 39 in its approach to crotch limit position, is resisted to move to horizontal position. This pulls the stem 32 in the guide 30, and the pin 41 audibly snaps clear of the fingers 47, signalling the individual that the measurement disclosure at the indicator 24 is length sought. The clamp 5, 9, may locate the column 8 for the desired lower start position from the vicinity of the heel for the accurate trouser leg inside length from the footwear up. A return guide 49 of the finger 47 directs the pin 41, upon the release of the arm 39, to re-enter the throat 48 as an automatic reset for the unit.

What is claimed and it is desired to secure by Letters Patent is:

1. A base providing foot position seats and a column clamp, a column mountable by the clamp to extend upward from the base, a top for the column, an actuator roller mounted in said column top, a follower roller housed by the column near the clamp, an endless measuring tape belt about the rollers, a fulcrum providing bracket mounted fixedly with the tape, said column having a guide slot thru which the bracket protrudes from the tape, a lever carried by the bracket to extend over the base as to one arm thereof, the other arm extending past the bracket into the column, an audible signal device responsive to depression of the over base arm of the lever operation of the other arm, there being an indicator for tape extent movement near the actuator roller.

2. Trouser leg inside measurement equipment including an upwardly extending tubular guide, pulleys in the upper and lower portions of said guide, an endless belt measuring tape about the pulleys, a pointer providing cap for the guide exposing the tape in proximity to the upper pulley, said guide having a slot, a gage arm connected thru the slot with the tape, and upper pulley actuating means for shifting the tape to position the gage arm.

3. Trouser leg inside measurement equipment including an upwardly extending tubular column, measuring means enclosed in the column and movable relatively thereto, a gage arm, a bracket connected to the measuring means to be moved thereby, said bracket providing pivotal mounting for the gage arm, an actuator for the measuring means, and a signal carried by the column and means operable by the arm rocking on its pivot relatively to the bracket, thereby notifying the operator to check the measuring means.

ARTHUR R. KNIPP.

REFERENCES CITED

The following references are of record in the file of this patent:

UNITED STATES PATENTS

| Number | Name | Date |
|---|---|---|
| 534,865 | Dolen | Feb. 26, 1895 |
| 674,442 | Hockersmith | May 21, 1901 |
| 1,933,446 | Olsen | Oct. 31, 1933 |
| 2,104,175 | Turpan | Jan. 4, 1938 |
| 2,112,929 | Shulman | Apr. 5, 1938 |
| 2,122,068 | Meyers | June 28, 1938 |
| 2,182,024 | Hoffman | Dec. 5, 1939 |
| 2,242,071 | Hoffman | May 13, 1941 |
| 2,386,181 | Bailey | Oct. 9, 1945 |

FOREIGN PATENTS

| Number | Country | Date |
|---|---|---|
| 48,773 | Sweden | May 31, 1920 |
| 277,345 | Germany | Aug. 10, 1914 |
| 409,063 | Great Britain | Apr. 26, 1934 |